United States Patent Office 3,586,540
Patented June 22, 1971

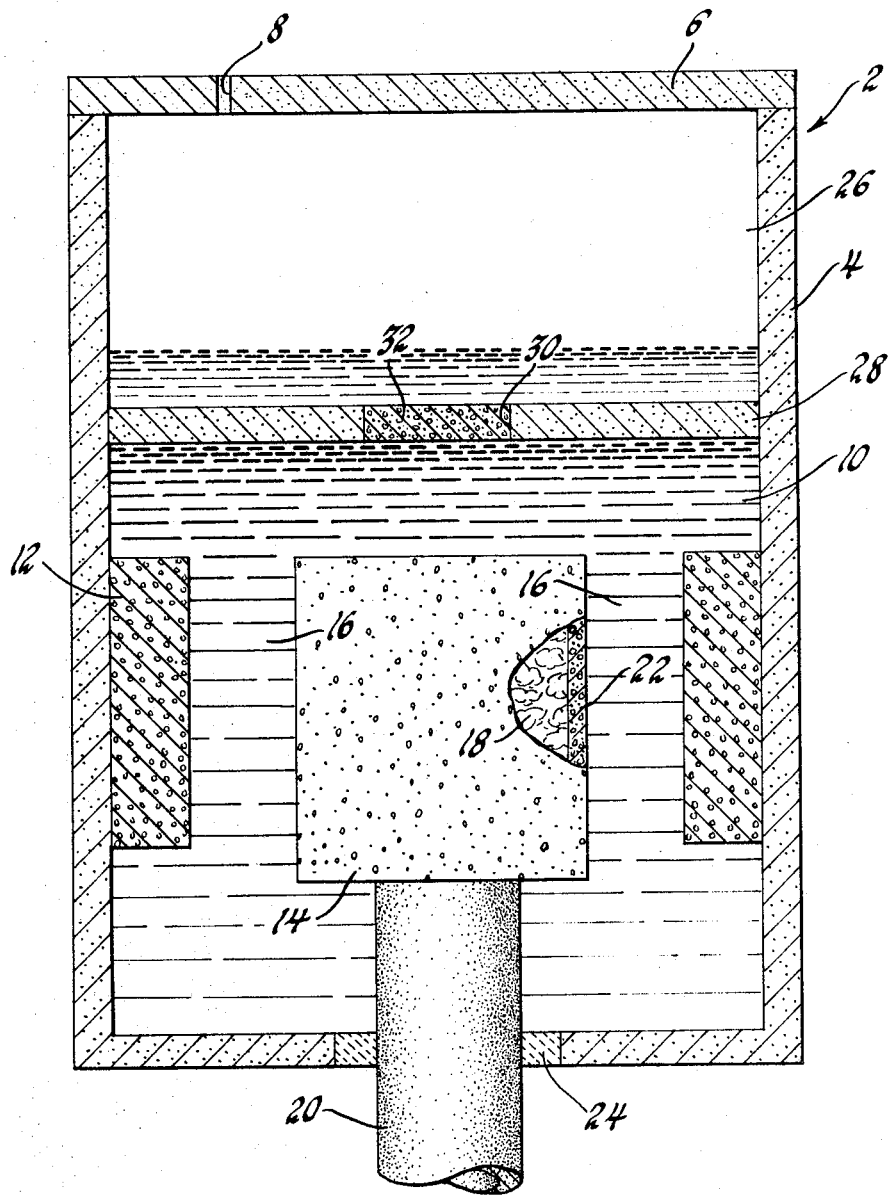

3,586,540
ATTITUDE AND GRAVITY INSENSITIVE GALVANIC CELL
John J. Petraits, Brownsburg, and George T. Sinnet, Indianapolis, Ind., assignors to General Motors Corporation, Detroit, Mich.
Filed Oct. 16, 1969, Ser. No. 866,921
Int. Cl. H01m 27/00
U.S. Cl. 136—86                             3 Claims

ABSTRACT OF THE DISCLOSURE

An alkali metal | alkali metal halide | halogen galvanic cell including an excess electrolyte reservoir, an electrochemically active region filled with electrolyte and containing the cell's electrodes, and a porous, carbon or graphite, nonelectrolyte-wettable, electrolyte flow restrictor located between the reservoir and the region. The restrictor keeps the region filled and the electrodes covered with electrolyte regardless of the cell's orientation and acts as an electrolyte relief means to prevent excessive electrolyte pressure buildup in the region. The restrictor's pores are larger than the pores of the carbon or graphite halogen electrode such that the flooding pressure of the restrictor is less than the flooding pressure of the electrode.

---

This invention relates to metal | alkali metal halide | halogen cell of the fused electrolyte type where the dis are to be used under varying conditions of cell orientation, and/or accelerative forces. More particularly, this invention relates to an alkali metal | alkali metal halide | halogen cell of the fused electrolyte type where the discharge reaction occurs in a substantially closed region filled with electrolyte and where discharge products formed in the region displace electrolyte therefrom. In the alkali metal | alkali metal halide | halogen cell, the discharge products, halides, are themselves electrolytes.

In the modern age of space and extraterrestrial exploration, there is a need for reliable, efficient high energy batteries for a variety of rocket and missile applications. Such applications involve severe operating conditions including extreme vibrational disturbances and varying gravitational and accelerative forces acting from various directions. Zero-gravity conditions may also be applicable. The vaying forces and directions of application influence the liquid levels, gas-liquid interfaces and electrochemical reaction interfaces of the cells used during the flight. These levels and interfaces shift and distort as a missile maneuvers from one position to another, causing variations in the cell's electrical output and efficiency. The maintenance of a uniform, fixed electrochemical reaction interface between a reactant and an electrolyte is required for continuity and uniformity of operation. This is best insured by keeping the region housing the cell's electrodes filled with electrolyte at all times.

Many fused electrolyte galvanic cells are attitude or gravity sensitive. Excess electrolyte generated during discharge of many of these cells has been vented from the cell region via complicated plumbing arrangements directed toward insuring that the space between the electrodes is continuously filled with electrolyte. An example of such a cell can be found in U.S. Pat. application Ser. No. 573,037, now U.S. Pat. 3,488,223 filed Aug. 17, 1966 in the name of T. G. Bradley and assigned to the assignee of this invention. In other cases, the plumbing is specifically positioned in a cell in relation to the cell's intended use.

It is an object of this invention to provide a readily standardized simple and effective means for providing positive containment of an electrolyte and thereby substantially reducing the attitude sensitivity of alkali metal | alkali metal halide | halogen cells.

The figure is a partially sectioned schematic representation of an alkali metal | alkali metal halide | halogen cell employing the features of this invention.

Briefly stated this invention comprehends a porous, non-halide-wettable, graphite or carbon plug as an electrolyte flow inhibitor. This plug is located between an electrochemically active region of the cell and an excess electrolyte reservoir. Flow through the plug commences only after the plug's flooding pressure is exceeded. The extent to which the plug inhibits or restricts flow depends on its pore size and the contact angle (wettability) of the halide with respect to carbon or graphite plugs. The pore size and wettability control the plug's flooding pressure.

In alkali metal | alkali metal halide | halogen cells, the halogen cathodes are comprised of porous carbon or graphite through which the halogen flows and at which it reacts with the electrolyte. These porous cathodes have flooding pressures which will vary according to cell design (i.e., the pore size, and degree of wettability of the particular carbon or graphite by the particular halide or halides being used). In the case of a Li | LiCl | $Cl_2$ cell, the contact angle of substantially pure LiCl with respect to an FC-11 graphite is about 140–150 degrees. The electrode will flood when the electrolyte pressure exceeds the surface tension forces resisting flooding. For cells where the electrolyte is contained in a substantially closed region, the discharge products buildup and rapidly increase the electrolyte pressure causing electrode flooding. If void space were provided in the electrochemically active region of the cell to accommodate the discharge products, the electrolyte-space interface would shift as the cell turned and could cause the electrolyte to drain from between the electrodes. Likewise under zero-gravity conditions, the electrolyte could float into the void space again draining electrolyte from between the electrodes.

By this invention, a cell is provided with an electrochemically active region which is completely filled with electrolyte and contains the cell's electrodes. With this invention, the electrolyte is held in this region at a substantially constant, predetermined pressure even during discharge of the cell and the continuous generation of reaction products in the region. An excess electrolyte reservoir is provided for receiving displaced electrolyte or reaction products generated on discharge. This reservoir is joined to the electochemically active region of the cell by means of a nonelectrolyte-wettable porous carbon or graphite plug or member which has pores larger than the pores of the graphite, halogen electrode. As a result, less pressure is required to flood the plug than is required to flood the electrode. The precise pore size of the plug will vary with the design requirements of the graphite electrode and the operating pressure of the electrochemically active region, but because of the larger pores, the flooding pressure of the plug will always be reached before the flooding pressure of the electrode during cell discharge. Once the plug's flooding pressure is exceeded, the discharge products or displaced electrolyte flows through the plug into the electrolyte reservoir where it is retained and where it can slosh about without detrimentally affecting operation of the cell.

The drawing depicts, in section, an alkali metal | alkali metal halide | halogen galvanic cell (e.g., Li | LiCl | $Cl_2$). A cell 2 comprises a container or housing 4 having a top or closure member 6, both being preferably made of dense graphite. A vent 8 is provided for relieving any gas buildup in the cell and/or for the passage of inert purging gases, such as argon or the like, into and out of the cell. The cell itself is divided into two major regions, the first being an electrolyte-filled, electrochemically active region 10 and the second a reaction product or displaced electrolyte reservoir 26. The region 10 contains the cell's electrodes 12 and 14. The cell's electrodes comprise, in this case, a lithium electrode 12 and a chlorine electrode 14. The electrodes 12 and 14 are immersed in a fused LiCl electrolyte 16 which fills the region 10.

The lithium electrode 12 is preferably of the porous metal type saturated with molten lithium. Molten lithium fills the interstices of the porous metal and is held therein by surface tension forces. Electrodes of this type are disclosed and claimed in copending U.S. patent applications Ser. No. 590,038 filed Oct. 27, 1966, in the name of Thompson G. Bradley et al., and Ser. No. 743,170 filed July 8, 1968, in the name of Gale M. Craig, and assigned to the assignee of this invention and as applicable are intended to be incorporated herein by reference. The electrode which is the subject of Ser. No. 590,038 is a wick which extends into the cell from a molten lithium storage region (not shown here) which is also a part of the system. The wick which is wetted by the molten lithium provides a plurality of capillary flow paths between the storage and cell regions of the system. As the lithium is consumed from the wick in the cell, additional lithium wicks into the cell. The electrode which is the subject of Ser. No. 743,170 is a porous bundle of lithium-wetted oriented filaments. The filaments are oriented to provide the equivalent of a pore size gradient such that the pores get smaller at the portion of the electrode adjacent the halogen electrode.

The halogen electrode 14 is a hollow cylinder of porous carbon or graphite. Chlorine gas 18 enters the electrode 14 through inlet tube 20 and passes through porous walls 22 to contact the electrolyte 16 for electrochemical reaction therewith at the electrode-electrolyte interface. The tube 20 is electrically conductive and preferably comprised of dense graphite. The tube 20 is insulated from the container 10 by a ceramic, e.g., BeO, insulator 24 and additionally functions as the current collector and lead for the chlorine electrode. In a preferred form, the chlorine electrode comprises graphite which has an average porosity of about 57% and a median pore diameter of about 0.7 micron as determined by the mercury intrusion method. The bulk of the material is comprised of pores less than about 1.2 microns diameter. For exceptionally effective operation, most of the electrodes' pores should be from about 0.2 micron to about 1 micron in diameter. Electrodes which have pore diameters less than about 0.2 micron tend to be chlorine flow limited—that is to say, the maximum current which the electrode will support is limited by the amount of chlorine that can effectively be passed through the wall 22. On the other hand, electrodes which have pore diameters greater than about 1 micron are chlorine diffusion limited—that is to say, the maximum current the electrode will support is limited by the rate of diffusion of dissolved chlorine through the electrolyte to the electrode-electrolyte interface. These materials and their properties in relation to the Li | LiCl | $Cl_2$ system are described in more detail in an article entitled "Characterization of a Porous Graphite $Cl_2$ Electrode," by D. A. J. Swinkels and R. N. Seefurth, Journal of the Electrochemical Society, vol. 115, No. 10, October 1968. It is to be appreciated that these porous carbons and graphites have a wide pore size distribution rather than a uniform pore size throughout or even a narrow ban of pore sizes. As a result when reference herein is made to pore sizes or ranges, it is intended to take this wide distribution range into consideration and to define materials which comprise at least about fifty percent of the specified range.

Adjacent the electrochemically active region 10 is an excess electrolyte storage chamber or reservoir 26. A partition 28 separates the region 10 from the chamber 26. A hole 30 is provided in the partition 28 to allow displaced electrolyte or reaction product to flow from the cell region 10 into the chamber 26. In this embodiment, the hole 30 has a porous carbon or graphite plug 32 inserted therein. The porous plug 32 has a pore size which is greater than the pore size of the chlorine electrode 14 so that the flooding pressure of the plug 32 is reached before the flooding pressure of the electrode 14. When in use with the preferred chlorine electrodes, the plug 32 has pores which in diameter are greater than about 1 micron and less than about 100 microns. If the pores were smaller, the chlorine electrode 14 would flood before the plug 32 and defeat the purpose of this invention. On the other hand, when the pores exceed about 100 microns in diameter, the plug is no longer a good LiCl flow restrictor since the flow resistance resulting from the effects of surface tension are substantially reduced. The size of the plug itself can vary. The minimum external dimensions of the plug 32 are a function of the maximum discharge rate of the cell—that is to say, the cross sectional area of the plug must be such as to accommodate the maximum volume of LiCl which can be generated in any specific time interval which is in turn dependent on the discharge rate of the cell. From a standardization standpoint, acceptable practice would be to simply use a single oversized plug 32 for most applications since low discharge rates can readily be accommodated while considerable capacity is left for handling higher LiCl flow rates during times of high current drain.

While this invention has been disclosed primarily in terms of a specific embodiment thereof, we do not intend to be limited thereto except to the extent hereinafter set forth.

We claim:

1. In a galvanic cell having an alkali metal reductant, an electrode for said alkali metal, a halogen oxidant, a nonelectrolyte-wettable porous carbon or graphite electrode for said halogen, a fused alkali metal halide electrolyte, an electrolyte-filled electrochemically active region containing said electrodes, a displaced electrolyte reservoir, means for separating said displaced electrolyte reservoir from said active region and passage means communicating said active region with said reservoir for passing displaced electrolyte on cell discharge from said region into said reservoir, the improvement comprising said passage means having a nonelectrolyte-wettable porous carbon or graphite member transverse said passage means and in blocking relation to the flow of electrolyte through said passage means, said member having pores which are larger than the pores of said carbon or graphite electrode, said member thereby having a flooding pressure which is less than the flooding pressure of said carbon or graphite electrode to insure electrolyte flooding of, and flow through, said member prior to electrolyte flooding of, and flow through, said carbon or graphite electrode.

2. A lithium | lithium chloride | chlorine galvanic cell comprising an electrode for said lithium, a porous carbon or graphite electrode for said chlorine in which said chlorine electrode consists essentially of pores less than about 1.2 microns in diameter, a fused lithium chloride electrolyte-filled region containing said electrodes, a displaced electrolyte reservoir, means for separating said displaced electrolyte reservoir from said region, passage means communicating said region with said reservoir for passing displaced lithium chloride from said region into said reservoir on cell discharge and a porous carbon or graphite, lithium chloride flow restrictor transverse said passage means, said restrictor consisting essentially of pores which are larger in diameter than the pores of said chlorine electrode to provide said restrictor with an electrolyte flooding pressure which is less than the electrolyte flooding pressure of said chlorine electrode.

3. The cell described in claim 2 wherein said chlorine electrode consists essentially of pores in the range of about 0.2 micron to about 1 micron in diameter and said restrictor consists essentially of pores greater than about 1 micron and less than about 100 microns in diameter.

References Cited

UNITED STATES PATENTS

| 1,637,991 | 8/1927 | Engle | 136—83 |
| 3,497,391 | 2/1970 | Grulke | 136—86 |

WINSTON A. DOUGLAS, Primary Examiner

H. A. FEELEY, Assistant Examiner

PO-1050
(5/69)

UNITED STATES PATENT OFFICE
CERTIFICATE OF CORRECTION

Patent No. 3,586,540      Dated June 22, 1971

Inventor(s) John J. Petraits and George T. Sinnet

It is certified that error appears in the above-identified patent and that said Letters Patent are hereby corrected as shown below:

In Column 1, line 30, after the word "halogen", delete "cell of the fused electrolyte type where the dis-" and insert -- galvanic cells and principally to such cells which --. Line 36, after the word "where" insert -- the --. Line 47, delete "vaying" and insert -- varying --. Column 2, line 41, delete the word "electolyte" and insert -- electrolyte --. Column 2, line 52, delete the word "electochemically" and insert -- electrochemically --.

Signed and sealed this 21st day of December 1971.

(SEAL)
Attest:

EDWARD M. FLETCHER, JR.
Attesting Officer

ROBERT GOTTSCHALK
Acting Commissioner of Patents